United States Patent [19]

Suzuki et al.

[11] Patent Number: 4,671,696
[45] Date of Patent: Jun. 9, 1987

[54] SHAFT ASSEMBLY AND MANUFACTURING PROCESS THEREOF

[75] Inventors: Tadashi Suzuki, Odawara; Hideo Koizumi; Jun Takeyama, both of Kanagawa; Kunitsugu Tsukui, Chigasaki, all of Japan

[73] Assignee: Hitachi, Ltd., Tokyo, Japan

[21] Appl. No.: 766,706

[22] Filed: Aug. 19, 1985

[30] Foreign Application Priority Data

Aug. 27, 1984 [JP] Japan .................................. 59-176802

[51] Int. Cl.⁴ ............................................. B25G 3/34
[52] U.S. Cl. ..................................... 403/265; 403/269; 403/273; 403/113; 403/360; 264/230; 264/242; 264/342 R; 384/91
[58] Field of Search ............... 403/265, 266, 267, 269, 403/273, 360, 113; 264/230, 271.1, 342 R, 242, 249; 29/447; 384/91, 297; 308/DIG. 4

[56] References Cited

U.S. PATENT DOCUMENTS

| | | | |
|---|---|---|---|
| 2,343,585 | 3/1944 | Schott | 384/297 X |
| 2,394,041 | 2/1946 | Conradty | 264/249 X |
| 2,724,867 | 11/1955 | Smith | 264/242 X |
| 3,321,565 | 5/1967 | Peterson et al. | 264/242 X |
| 3,443,005 | 5/1969 | Braun | 264/242 X |
| 3,785,217 | 1/1974 | Peura | 264/242 X |
| 3,879,828 | 4/1975 | Troost | 29/447 X |
| 3,917,789 | 11/1975 | Heisler | 264/242 X |
| 4,035,534 | 7/1977 | Nyberg | 264/230 X |
| 4,158,511 | 6/1979 | Herbenar | 384/297 X |
| 4,179,313 | 12/1979 | Koch et al. | 403/269 X |
| 4,210,620 | 7/1980 | Von Holdt | 264/242 X |

*Primary Examiner*—Cornelius J. Husar
*Assistant Examiner*—Todd G. Williams
*Attorney, Agent, or Firm*—Fay, Sharpe, Beall, Fagan, Minnich & McKee

[57] ABSTRACT

A shaft assembly comprises a shaft having at least one small diameter portion located on the way in the axial direction thereof, and at least one member mounted to the outer periphery of the small diameter portion of the shaft rotatably and/or movably in the axial direction. The shaft assembly is produced by first forming the member on a large diameter portion of the shaft and then moving the member from the large diameter portion to the small diameter portion. The member moved to the small diameter portion is mounted to the small diameter portion rotatably and/or movably in the axial direction by the shrinkage thereof.

13 Claims, 18 Drawing Figures

SHAFT ASSEMBLY AND MANUFACTURING PROCESS THEREOF

FIELD OF THE INVENTION AND RELATED ART STATEMENT

This invention relates to a shaft assembly comprising a shaft and a cylindrical member rotatably and/ or axially movably mounted on the shaft and a method of manufacturing such shaft assembly.

Heretofore, it has been usual practice to manufacture the shaft assembly as follows. A shaft 1 and a cylindrical member 2 having an inner diameter $D_1$ greater than the outer diameter D of the shaft 1 are fabricated separately as shown in FIG. 1. The cylindrical member 2 is fitted to an outer peripheral surface of the shaft 1 through one end portion thereof and secured in the predetermined position by pins 3 and 3' which are pressfitted to the shaft 1 at both sides of the cylindrical member 2. The pins 3 and 3' perform the functions of both avoiding the dislodging of the cylindrical member 2 from the shaft 1 and regulating the range of axial movements of the cylindrical member on the shaft 1. In place of the pins 3 and 3', retaining rings may be secured to the outer peripheral surface of the shaft 1.

In the shaft assembly of the prior art described hereinabove, support members, such as the pins 3 and 3' or retaining rings, are used for supporting the cylindrical member 2 on the outer peripheral surface of the shaft 1. The use of the support members makes it necessary to form holes or grooves on the outer peripheral surface of the shaft 1 for securing the support members on the shaft 1. The operation of forming the holes or grooves is time-consuming and increases the number of steps for manufacturing a shaft assembly, because the number of parts to be assembled increases. This increases production costs. This problem becomes serious when a plurality of cylindrical members 2 are assembled with the shaft 1.

OBJECT AND SUMMARY OF THE INVENTION

This invention has been developed for the purpose of obviating the aforesaid disadvantages of the prior art. Accordingly, the object of the invention is to provide a shaft assembly and a manufacturing process thereof which is capable of readily and positively mounting a cylindrical member to an outer peripheral surface of a shaft, whereby the number of parts of the assembly and the number of process steps for manufacturing the assembly can be reduced to prevent an increase in cost.

A shaft assembly according to the invention comprises a shaft having at least one small diameter portion located on the way in the axial direction, and at least one cylindrical member mounted to the small diameter portion of the shaft rotatably and/or movably in the axial direction by the shrinkage of the cylindrical member.

The method of manufacturing a shaft assembly according to the invention comprises setting a shaft in a mold for forming a cylindrical member to be mounted to the shaft, the shaft having at least one small diameter portion on the way in the axial direction, forming by molding the cylindrical member on an outer periphery of a large diameter portion of the shaft, removing the cylindrical member from the mold together with the shaft, and moving the cylindrical member from the large diameter portion of the shaft to the samll diameter portion thereof whereby the cylindrical member can be mounted to an outer periphery of the small diameter portion of the shaft rotatably and/ or movably in the axial direction by the shrinkage of the cylindrical member.

DETAILED DESCRIPTION OF THE PREFERRED EMBODIMENTS

A preferred embodiment of the invention in which a cylindrical member is mounted on a shaft rotatably and movably in the axial direction will now be described by referring to FIGS. 2-9.

Figure 1:
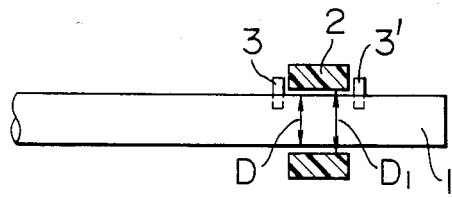
FIG. 1 is a front view of one example of a shaft assembly of the prior art.
Figure 2:
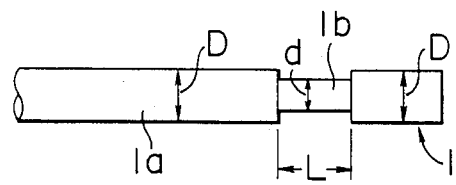
FIG. 2 is a front view of a shaft assembly according to one embodiment of the invention.

Referring to FIG. 2, a shaft 1 is formed with a small diameter portion 1b located on the way in the axial direction. The small diameter portion 1b has an outer diameter d smaller than the outer diameter D of a large diameter portion 1a of the shaft 1, and an axial length L of a suitable value. Thus, the shaft 1 comprises the large diameter portion 1a and small diameter portion 1b.

The shaft 1 of the aforesaid construction is set in a mold 10 for forming a cylindrical member 2, and a molding material is injected into the mold 10, to thereby form the cylindrical member 2 on the outer periphery of the large diameter portion 1a of the shaft 1. The molding material for forming the cylindrical member 2 may be of any thermoplastic material which is lower in melting point than the material for forming the shaft 1, such as a polyacetal resin.

Figure 3:
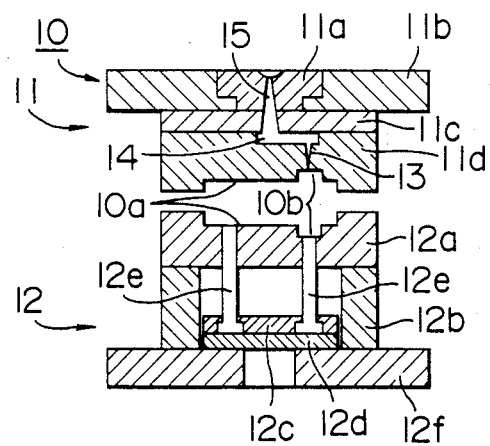
FIG. 3 is a sectional view of the mold used for forming the cylindrical member according to the invention.
Figure 4:
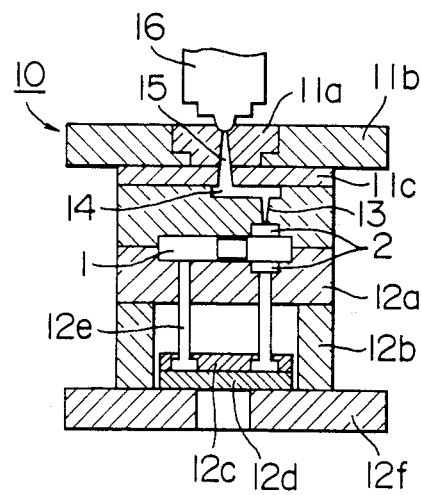
FIG. 4 is a sectional view of the mold shown in FIG. 3, showing the manner in which the cylindrical member is formed.
Figure 5:
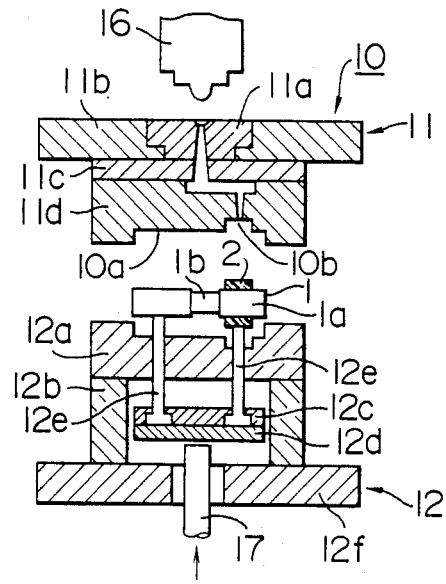
FIG. 5 is a sectional view of the mold shown in FIG. 3, showing the manner in which the cylindrical member is removed from the mold.
Figure 6:
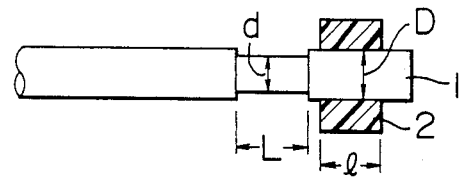
FIG. 6 is a sectional view of the cylindrical member and shaft being removed from the mold.

FIGS. 3–5 show the mold 10 for forming the cylindrical member 2 which comprises a stationary mold member 11 and a movable mold member 12. The stationary mold member 11 comprises a mounting plate 11b having a sprue bush 11a, an intermediate plate 11c and a pattern plate 11d, and the movable mold member 12 comprises a pattern plate 12a a spacer block 12b, an ejector plate 12d, an ejector pin 12e and a mounting plate 12f. The pattern plate 11d of the stationary mold member 11 and the pattern plate 12a of the movable mold member 12 define therebetween a relief 10a for the shaft 1 inserted in the mold 10 and a cavity 10b communicating with a gate 13 for forming the cylindrical member 2. The gate 13 is connected to a sprue 15 via a runner 14.

The mold 10 of the aforesaid construction is used for forming the cylindrical member 2 by injection molding as the shaft 1 is inserted in the relief 10a for the shaft 1 of the movable mold member 12 when the mold 10 is opened. Then, the movable mold member 12 is moved upwardly into engagement with the stationary mold member 11 and the two mold members 11 and 12 are clamped together. More specifically, after the mold is clamped, the molding material is injected into the mold 10 through a nozzle 16 as shown in FIG. 4. The molding material flows via the sprue 15, runner 14 and gate 13 into the cavity 10b defined by the pattern plates 11d and 12a. The molding material filled into the cavity 10b formed into the cylindrical member 2 on the outer periphery of the large diameter portion 1a of the shaft 1.

After lapse of a predetermined period of time, or when the molding material has set, the movable mold member 12 is moved downwardly and an ejector rod 17 is moved upwardly as shown in FIG. 5 to move the ejector plates 12c and 12d and the ejector pins 12e upwardly, to thereby remove the cylindrical member 2 from the mold 10 together with the shaft 1. At this time, the cylindrical member 2 has not fully shrinked yet, so that it has an inner diameter substantially equal to the outer diameter D of the large diameter portion 1a. It is essential that the cylindrical member 2 be removed from the mold 10 before shrinkage thereof is finished.

Figure 7:
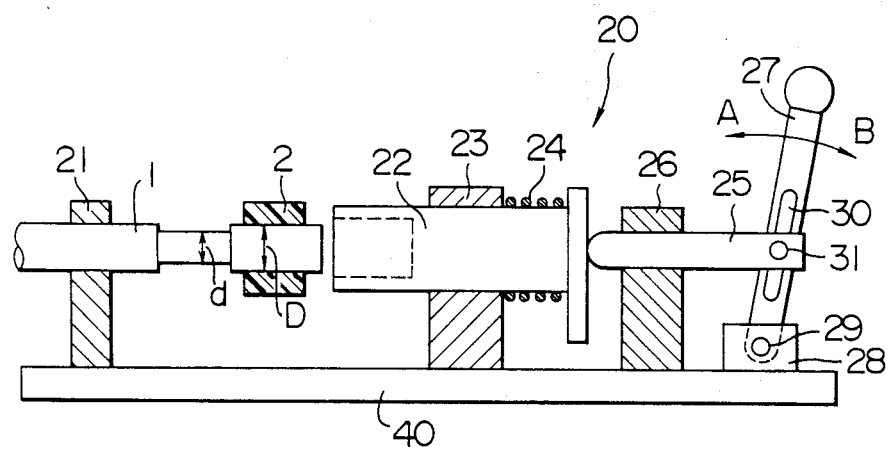
FIG. 7 is a sectional front view of the moving means.
Figure 8:
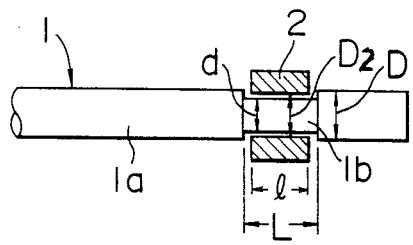
FIG. 8 is a sectional view of the shaft assembly according to the invention.

After the cylindrical member 2 is removed from the mold 10, moving means 20 is actuated to move the cylindrical member 2 from the large diameter portion 1a of the shaft 1 to the small diameter portion 1b thereof. As shown in FIG. 7, the moving means 20 comprises a clamp bar 21 for clamping the shaft 1, a pusher 22 supported by a post 23 for axial movement and located in a position in which it faces the cylindrical member 2 on the shaft 1, a spring 24 for urging the pusher 22 to move in a direction away from the cylindrical member 2, a slide bar 25 supported by a post 26 for movement in the axial direction of the pusher 22 and capable of moving the pusher 22, and an operating lever 27 maintained in engagement with the slide bar 25 and pivotably supported on a base 40. The operating lever 27 has a pin 29 at one end thereof which engages a block 28 on the base 40 and is formed at an intermediate portion thereof with an axially extending slot 30 which receives a pin 31 projecting from one end of the slide bar 25.

In the moving means 20 of the aforesaid construction, the pivotal movement of the operating lever 27 in the direction of an arrow A when the shaft 1 is being clamped by the clamp bar 21 causes the slide bar 25 to advance to move the pusher 22 forwardly, so that the pusher 22 pushes the cylindrical member 2 forwardly from its position on the large diameter portion 1a of the shaft 1 to a position on the small diameter portion 1b thereof.

The pivotal movement of the operating lever 27 in the direction of an arrow B causes the slide bar 25 to move backwardly to allow the pusher 22 to be moved to its original position by the biasing force of the spring 24. In the moving means 20 of the aforesaid construction, the pusher 22 is moved forwardly by the advancing of the slide bar 25. However, this is not restrictive and the slide bar 25 may be pivotably supported by the post 26 and the pusher 22 may be moved forwardly by the pivotal movement of the slide bar 25.

The cylindrical member 2 moved by the moving means 20 to the small diameter portion 1b of the shaft 1 shrinks by being cooled, with a result that it has an inner diameter $D_2$ which is smaller than the outer diameter D of the large diameter portion 1a but greater than the outer diamter d of the small diameter portion 1b. Thus, the outer diameter D of the large diameter portion 1a the inner diameter $D_2$ of the cylindrical member 2 and the outer diameter d of the small diameter portion 1b are related as follows: $D > D_2 > d$.

This makes it possible to mount the cylindrical member 2 to the outer periphery of the small diameter portion d of the shaft 1 rotatably and movably in the axial direction.

Figure 9:
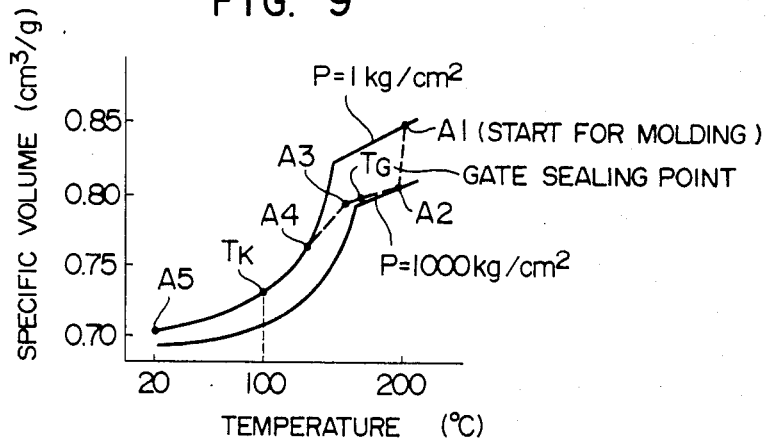
FIG. 9 is a diagram showing the specific volume-temperature characteristic of the material for forming the cylindrical member by molding.
Figure 10:
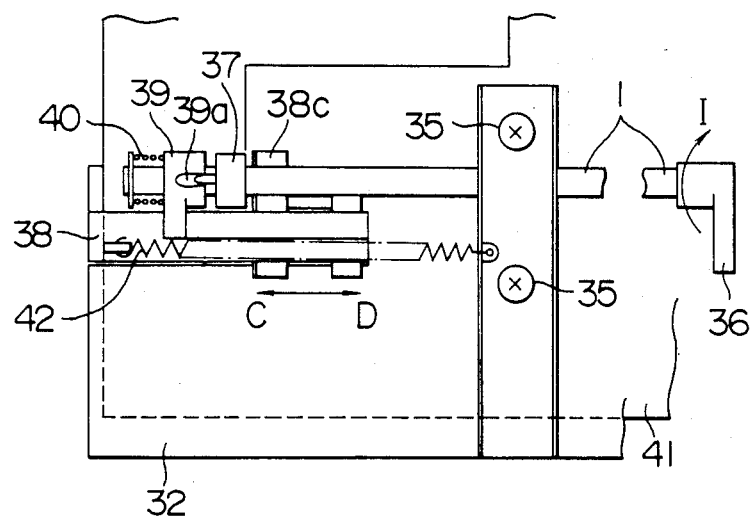
FIG. 10 is a plan view of automatic ejection means of a recording medium of a magnetic recording apparatus in which the shaft assembly according to the invention is incorporated.

The process and details of the operation for bringing the inner diameter $D_2$ of the cylindrical member 2 into the aforesaid relationship with the outer diameter D of the large diameter portion 1a and the outer diameter d of the small diameter portion 1b will be described, by referring to FIG. 9. In FIG. 9, there is shown the specific volume-temperature characteristic of polyacetal resin for forming the cylindrical member 2. As shown, when the cylindrical member 2 is formed by injection molding with an injection pressure of 1000 kg/cm$^2$, a resin temperature of 200° C. and a mold temperature of 100° C., the resin passes through various temperatures designated by $A_1$, $A_2$, $A_3$, $A_4$ and $A_5$. The temperature range $A_1$–$A_2$ corresponds to a step in which the resin is filled into the cavity 10d defined between the stationary and movable mold members 11 and 12 and compressed therein; the temperature range $A_2$–$A_3$ corresponds to a step in which the resin is kept at a predetermined pressure; the temperature range $A_3$–$A_4$ corresponds to a step in which the resin is allowed to stand in the cavity 10b for a predetermined period of time; the temperature point $A_4$ designates a point at which the pressure in the cavity 10b becomes equal to one atmospheric pressure (the inner diameter $D_2$ of the cylindrical member 2 becomes equal to the outer diameter D of the large diameter portion 1a of the shaft 1); and the temperature range $A_4$–$A_5$ corresponds to a step in which the resin is shrinked freely.

In the free shrinkage step $A_4$–$A_5$, the cylindrical member 2 formed as a unit with the shaft 1 is removed from the mold 10 when the temperature of the resin drops to the mold temperature level 100° C. (point $T_K$), and immediately moved by the moving means 20 to the position on the outer periphery of the small diameter portion 1b of the shaft 1. The cylindrical member 2 is cooled to the room temperature point $A_5$ (20° C.) and shrinks. That is to say, the inner diameter $D_2$ of the cylindrical member 2 formed of the resin is obtained by shrinking as the temperature drops from T to the room temperature point $A_5$, so that the relation $D > D_2 > d$ referred to hereinabove can be effected. The polyacetal resin shrinks at a predetermined rate under the certain conditions of temperature and pressure as shown of FIG. 9.

By grasping the specific volume-temperature characteristic of a material for forming the cylindrical member 2 by molding, it is possible to satisfy the relation described hereinabove. To this end, the outer diameter d of the small diameter portion 1b of the shaft 1 is made smaller beforehand than the diameter $D_2$ of the cylindrical member 2 and the length L of the small diameter portion 1b is made greater than the length l of the cylindrical member 2.

One example of incorporating the shaft assembly provided by the invention in automatic ejection means of a recording medium of a magnetic recording apparatus will now be described by referring to FIGS. 10–16. As shown, a block 33 located on a holding plate 32 supports the shaft 1 of the shaft assembly which is secured to the block 33 by holding plates 34A and 34B and screws 35. A door lever 36 is secured to one end of the shaft 1.

Figure 15:
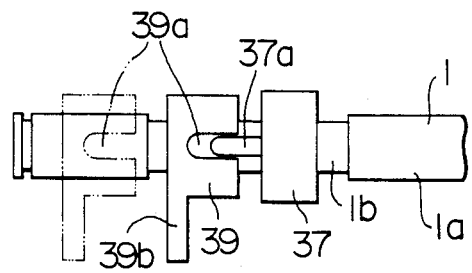
FIGS. 15 and 16 are a front view and a sectional view, respectively, of the essential portions of the shaft assembly incorporated in the automatic ejection means.
Figure 16:
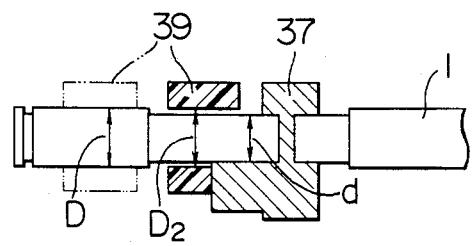

A cam 37 having a cam mechanism for gripping a recording medium, not shown, is secured to the small diameter portion 1b of the shaft 1 located at the opposite side to which the door lever 36 is secured, and a kicker 39 maintained in engagement with the cam 37 and constituted by the cylindrical member 2 of the shaft assembly is located at the small diameter portion 1b. As shown in FIGS. 15 and 16, the small diameter portion 1b of the shaft 1 extends through the kicker 39. The inner diameter $D_2$ of the kicker 39 is greater than the outer diameter d of the small diameter portion 1b and smaller than the outer diameter D of the large diameter portion 1a of the shaft 1. The kicker 39 is urged by the biasing force of a compression spring 40 mounted between the kicker 39 and the opposite end of the shaft 1 to move toward the cam 37. The cam 37 is secured in place on the small diameter portion 1b of the shaft 1 by being molded in such a manner that the resin thereof penetrates the small diameter portion 1b.

The kicker 39 is formed at one end portion thereof with a cutout 39a with which a key 37a of the cam 37 is adapted to come into engagement. An arm 39b adapted to come into engagement with an ejector 38 extends from the peripheral portion of the kicker 39. The ejector 38 which ejects a jacket 41 for sealing the recording medium therein is guided by the shaft 1 through an arm 38c for sliding on the holding plate 32 in the directions of arrows C and D. A tension spring 42 is mounted between an upper portion of the ejector 38 and the holding plate 34B to urge the ejector 41 to move in the direction of the arrow D.

Figure 11:
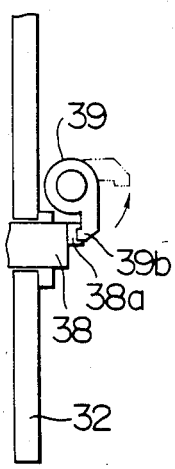
FIG. 11 is a left side view, with certain parts being broken away, of the automatic ejection means shown in FIG. 10.
Figure 12:
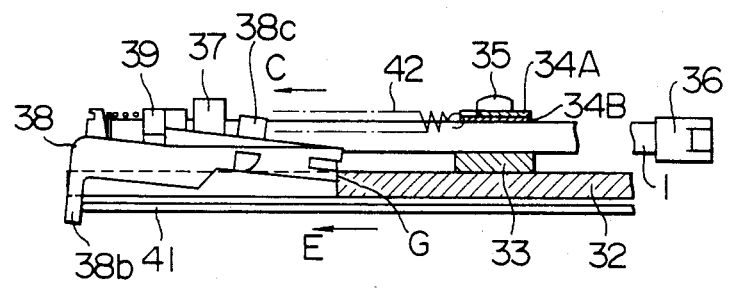
FIG. 12 is a front view of the automatic ejection means shown in FIG. 10.
Figure 14:
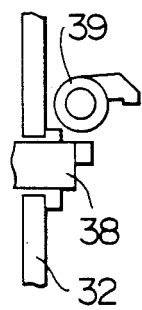
FIG. 14 is a left side view of the automatic ejection means shown in FIG. 13.
Figure 13:
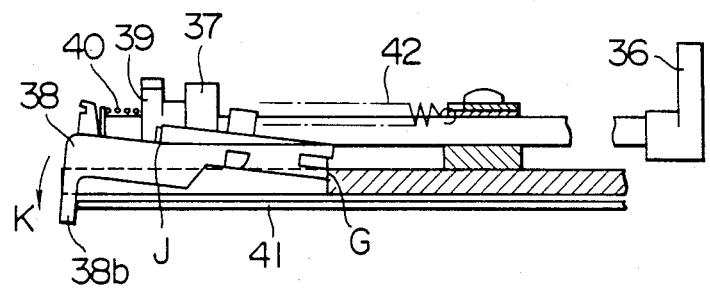
FIG. 13 is a front view of the automatic ejection means shown in FIG. 10, showing a recording medium being gripped by a chuck.

Assume that the arm 39b of the kicker 39 is maintained in engagement with the ejector 38 as shown in FIG. 11. Upon the jacket 41 being inserted in the direction of an arrow E shown in FIG. 12, a forward end of the jacket 41 abuts against a leg 38b of the ejector 38 and causes the ejector 38 to move in sliding movement in the direction of the arrow C together with the kicker 39. The movement of the ejector 38 stops as the ejector 38 is latched at a latch point G on the holding plate 32. Turning the door lever 36 in the direction of an arrow I to rotate the shaft 1 through 90 degrees causes the kicker 39 to rotate in the same direction as the shaft 1 as indicated by phantom lines in FIG. 11 because the key 37a of the cam 37 is maintained in engagement with the cutout 39a of the kicker 39. Thus, the arm 39b of the kicker 39 is released from engagement with an engaging portion 38a of the ejector 38 and the kicker 39 is forced by the biasing force of the compression spring 40 to move axialy of the shaft 1 toward the cam 37.

To withdraw the jacket 41, the door lever 36 is turned in a direction opposite the direction of the arrow 1 to restore the shaft 1 to the original position. This returns the cam 37 and kicker 39 to their original positions. At this time, the kicker 39 pushes a portion J of the ejector 38, so that the leg 38b of the ejector 38 tilts in the direction of an arrow K and a rear end portion of the ejector 38 moves upwardly, to thereby release the ejector 38 from latching engagement with the holding plate 32 at the latch point G. The ejector 38 thus unlatched is moved back in the direction of the arrow D by the biasing force of the tension spring 42, to thereby eject the jacket 41.

By using the cylindrical member 2 of the shaft assembly as the kicker 39 of the automatic ejection means, it is possible to arrange the kicker 39 on the small diameter portion 1b of the shaft 1 by moving the cylindrical member 2 to the outer periphery of the small diameter portion 1b by the moving means 20 shown in FIG. 7 immediately after the kicker 39 is provided. This not only eliminates the need to assemble the kicker 39 with the shaft 1 as has hitherto been the case but also does without a part for supporting the kicker 39, much less the need to secure the part for supporting the kicker 39 to the shaft 1. Moreover, the cam 37 can be formed simultanuously as the kicker 39 is formed. This makes it possible to obtain the kicker 39 and cam 37 by using one type of mold, thereby greatly reducing the number of steps of the molding operation and the period of time required for performing the molding operation.

Figure 17:
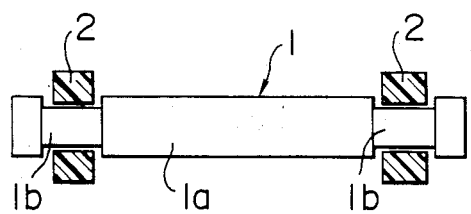
FIG. 17 is a front view of a modification of the shaft assembly according to the invention.
Figure 18:
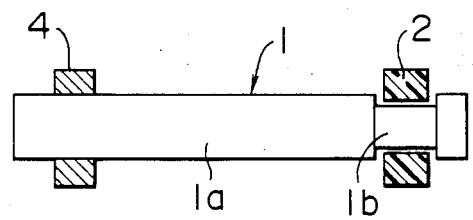
FIG. 18 is a front view of another modification of the shaft assembly according to the invention.

While the invention has been shown and described by referring to a preferred embodiment thereof, it is to be understood that the invention is not limited to this specific form of the embodiment. The invention may have application in the production of free flow conveyor rollers or wheels of a toy by providing the cylindrical member 2 to the small diameter portion 1b located on either end portion of the shaft 1, as shown in FIG. 17. Also, the shaft 1 may be formed, as shown in FIG. 18, with the cylindrical member 2 at one end thereof and with a stationary member 4 at an opposite end. The stationary member 4 which may be a gear, for example, may be connected to an external power source so that the stationary member 4 and shaft 1 may rotate together while the cylindrical member 2 may be held free from rotation with the shaft 1 and stationary member 4.

The above-mentioned embodiment is the embodiment which a cylindrical member is mounted on a shaft rotatably and movably in the axial direction of the shaft. However, it is to be noted that the invention is not limited to this specific form of the embodiment. The cylindrical member may be mounted on the shaft only rotatably or only movably in the axial direction of the shaft. In the case where a cylindrical member is mounted on a shaft only rotatably, it is achieved by making the axial length L of the small diameter portion of the shaft slightly smaller than that of the cylindrical member. Additionally, in the case where a cylindrical member is mounted on a shaft only movably in the axial direction, it is achieved by making the cross sectional configuration of the small diameter portion of the shaft into noncircular configuration and by making the length L of the small diameter portion of the shaft into the length of which the cylindrical member is permitted to move.

Although, in the above-mentioned embodiment, the member to be mounted on the shaft is cylindrical, it will be found that the member is not limited to the cylindrical configuration but may be any configuration.

Further, although the cylindrical member is moved from the large diameter portion to the small diameter portion of the shaft by being pushed by the pusher, it is also possible that the cylindrical member is set on the small diameter portion of the shaft by moving the shaft while the cylindrical member is fixed.

From the foregoing description, it will be appreciated that, in the shaft assembly according to the invention, a cylindrical member is mounted to a small diameter portion of a shaft rotatably and/or movably in the axial direction. The invention offers the advantages that any support members for supporting the cylindrical member are not needed and that the need to work on the support member and the shaft to secure the support member to the shaft can be eliminated. This makes it possible to reduce the number of parts to be assembled and the number of process steps to be performed in achieving the assembling of the parts while enabling the assembling to be performed efficiently. This is conducive to reduced production costs.

The method of manufacturing a shaft assembly according to the invention offers the advantage that a cylindrical member can be readily and positively mounted to a shaft. According to the method provided by the invention, the cylindrical member is formed on the outer periphery of a large diameter potion of the shaft and moved to the outer periphery of a small diameter portion of the shaft, so that the cylindrical member can be mounted to the small diameter portion of the shaft rotatably and/or movably in the axial direction by shrinkage thereof.

What is claimed is:

1. A shaft assembly, comprising:
   a shaft having a first small portion of generally uniform cross section extending for a substantial axial length, having second and third shaft portions respectively on opposite axial ends of and immediqtely adjacent said first shaft portion and having an adjacent cross-sectional shape larger than said first shaft portion, having shoulder portions respectively connecting said first shaft portion to each of said second and third shaft portions, and at least one of said second and third shaft portions having a cross-sectional exterior shape immediately adjacent said first shaft portion that is larger than and otherwise substantially identical to the cross-sectional exterior shape of said first shaft portion for at least a fixed axial extent;
   an annular member mounted on said first shaft portion and having an axial extent equal to said fixed axial extent, and an internal surface configuration that is generally uniform throughout the axial extent of said member, said internal configuration being smaller than and otherwise identical to the external surface configuration of said at least one shaft portion;
   said annular member being of a moldable synthetic resin material having a molding temperature substantially lower than the melting temperature of the material of said shaft; and
   said resin having specific volume versus temperature characteristics relative to the specific volume versus temperature characteristics of the material of said shaft such that when molded on said at least one shaft portion and solidified, it may be thereafter axially moved off said at least one shaft portion to surround said first shaft portion, said member will shrink at a greater rate than said shaft as they cool from an elevated mold release temperature to the environment temperature sufficiently that there is formed an axial interference relationship between said shoulders and said member to limit the axial movement of said member on said shaft.

2. The shaft assembly of claim 1, wherein the external configuration of said shaft first portion and said one shaft at least portion is cylindrical, and the internal configuration of said annular member is cylindrical, so that said annular member is rotatably mounted on said shaft.

3. The shaft assembly of claim 1, wherein the axial distance between said shoulders is substantially greater than the axial dimension of said member, so that said annular member is mounted for limited axial movement on said shaft.

4. The shaft assembly of claim 3, wherein the external configurationo of said shaft first portion and said one shaft at least portion is cylindrical, and the internal configuration of said annular member is cylindrical, so that said annular member is rotatably mounted on said shaft 5. The shaft assembly of claim 1, further including a second annular member on said first shaft portion immediately adjacent said first mentioned annular member;
   said second annular member being of the same material as said first annular member and being molded directly on said first shaft portion to thereby have its internal configurationo substantially identical to the external configuration of said first shaft portion.

6. The shaft assembly of claim 5, wherein said second annular member includes a unitary portion projecting inwardly into a correspondingly shaped aperture of said first portion to provide means for preventing relative movement between said second annular member and said shaft.

7. The shaft assembly according to claim 1, wherein said annular member is constructed of polyacetal resin.

8. A shaft assembly method, comprising:
   providing a shaft having a first small portion of generally uniform cross section extending for a substantial axial length, having second and third shaft portions respectively on opposite axial ends of and immediately adjacent the first shaft portion and having an adjacent cross-sectional shape larger than the first shaft portion, having shoulder portions respectively connecting the first shaft portion to each of the second and third shaft portions, and at least one of the second and third shaft portions having a cross-sectional shape immediately adjacent said first shaft portion that is larger than and otherwise substantially identical to a cross-sectional shape of the first shaft portion and for at least a fixed axial extent;
   forming the annular member on the first shaft portion to have an axial extent equal to the fixed axial extent, and an internal surface configuration that is generally uniform throughout the axial extent of the member, the internal configuratioon being smaller than and otherwise identical to the external surface configuration of the at least one shaft portion;

said forming including providing a moldable synthetic resin material having a molding temperature substantially lower than the melting temperature of the material of the shaft and said forming including molding the resin on said external surface of the configurated one shaft at least portion in the mold and solidifying the resin into the general shape of the annular member;

said forming further including thereafter axially moving the thus molded annular member off the at least one shaft portion to surround first shaft portion, and shrinking the member in internal configuration at a greater rate than the shaft as they cool from an elevated mold release temperature to the environment temperature sufficiently that there is formed an axial interference relationship between the shoulders and the member to limit the axial movement of the member on the shaft.

9. The shaft assembly method of claim 8, wherein said providing includes placing the shaft in the mold as a preform.

10. The shaft assembly of claim 9, further including molding a second annular member simultaneously with said first mentioned molding step, adjacent said first mentioned annular member, of the same material as the first annular member and directly on the first shaft portion to thereby have its internal configuration substantially identical to the external configuration of said first shaft portion.

11. The shaft assembly of claim 10, wherein said molding of the second annular member includes molding a unitary portion projecting inwardly into a correspondingly shaped aperture of the first shaft portion to provide means for preventing relative movement between the second annular member and the shaft.

12. The shaft assembly according to claim 11, wherein said step of providing provides the resin as polyacetal resin.

13. The shaft assembly according to claim 8, wherein said step of providing provides the resin as polyacetal resin.

* * * * *